July 4, 1939. O. A. BAILEY Re. 21,135

LIQUID STORAGE TANK WITH FLOATING ROOF

Original Filed Aug. 13, 1932 5 Sheets-Sheet 1

Inventor:
Otterbein A. Bailey,
By Smyth, Lee, Christy & Wiles,
Attys.

LIQUID STORAGE TANK WITH FLOATING ROOF

Original Filed Aug. 13, 1932 5 Sheets-Sheet 2

Inventor:
Otberbein A. Bailey,
By Wyngarth, Lee, Christy & Miles,
Attys.

July 4, 1939. O. A. BAILEY Re. 21,135

LIQUID STORAGE TANK WITH FLOATING ROOF

Original Filed Aug. 13, 1932 5 Sheets-Sheet 3

Inventor:
Otterbein A. Bailey,
By Lynn Smith, Lee, Clinton & Miles,
Att'ys

LIQUID STORAGE TANK WITH FLOATING ROOF

Original Filed Aug. 13, 1932 5 Sheets-Sheet 4

Inventor:
Otberbein A. Bailey,
By Dyrnforth & Clinton & Wiles,
Attys.

July 4, 1939. O. A. BAILEY Re. 21,135

LIQUID STORAGE TANK WITH FLOATING ROOF

Original Filed Aug. 13, 193[illegible] 5 Sheets-Sheet 5

Inventor:
Otterbein A. Bailey,
By Dyrenforth, Lee, Christy & Miles,
Attys.

Reissued July 4, 1939

Re. 21,135

UNITED STATES PATENT OFFICE 21,135

LIQUID STORAGE TANK WITH FLOATING ROOF

Otterbein A. Bailey, Chicago, Ill., assignor to Chicago Bridge & Iron Company, Chicago, Ill., a corporation of Illinois Original No. 1,932,392, dated October 31, 1933, Serial No. 628,753, August 13, 1932. Application for reissue February 15, 1939, Serial No. 256,611

7 Claims. (Cl. 220—26)

This invention relates to improvements in liquid storage tanks with floating roof and more especially, to means in connection with such a device for sustaining the roof spaced above the bottom of the tank when the latter is empty. It is frequently necessary or desirable to support the roof temporarily a certain distance above the bottom of the tank when the same is empty for cleaning, repair and inspection purposes. Such a temporary support can also be used in connection with or for aiding in the construction and erection of the tank, roof or parts thereof.

The distance above the bottom of the tank that the roof is thus temporarily supported is ordinarily high enough to permit workmen to operate under the same. In the normal operation of the roof, however, when the same is floating on liquid in the tank, it is desirable to have the roof descend to a lowest point somewhat closer to the bottom of the tank. To permit this, therefore, the temporary sustaining means must be so constructed that it can be rendered inoperative or partially inoperative, and vice versa, when liquid is in the tank.

One of the features of my invention is the provision of such sustaining means for a roof which will fulfill the requirements above referred to.

Other features and advantages of my invention will appear more fully as I proceed with my specification.

In those forms of devices embodying the features of my invention shown in the accompanying drawings—

Figure 1:
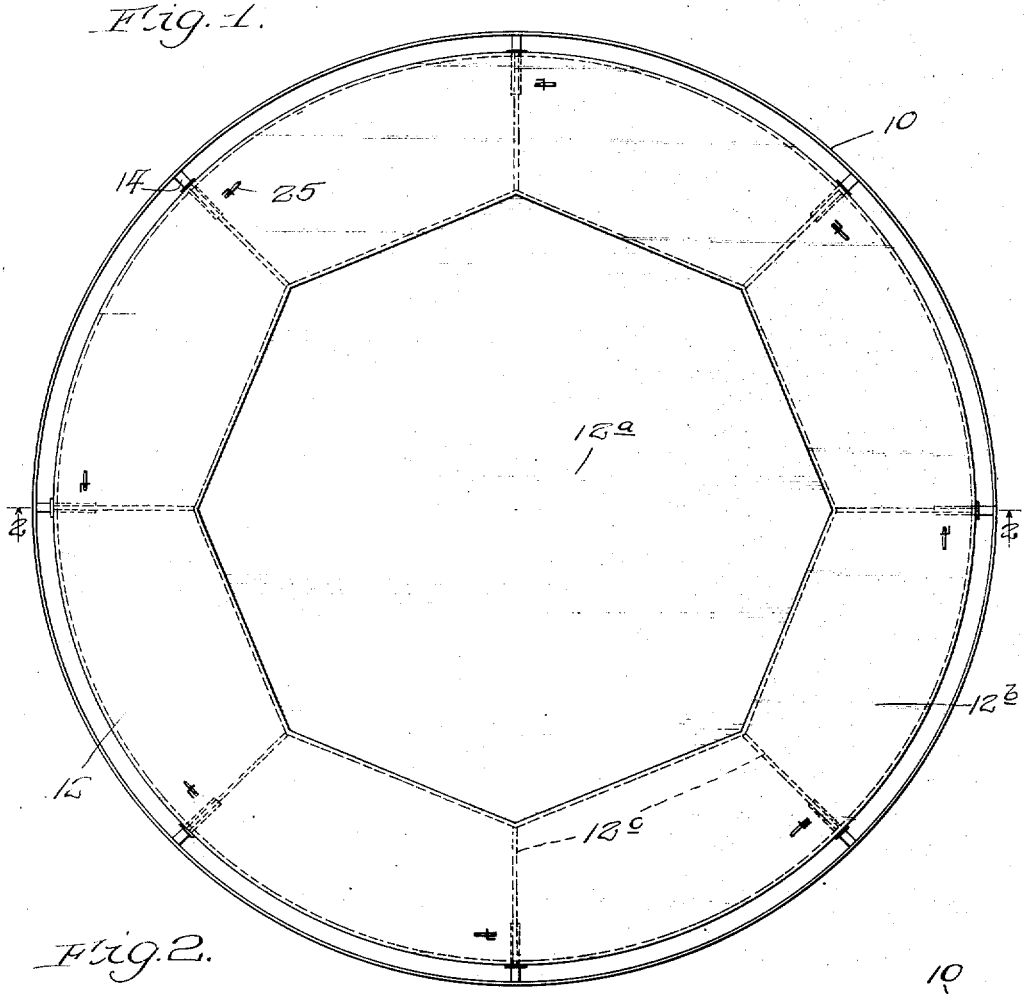
Figure 2:
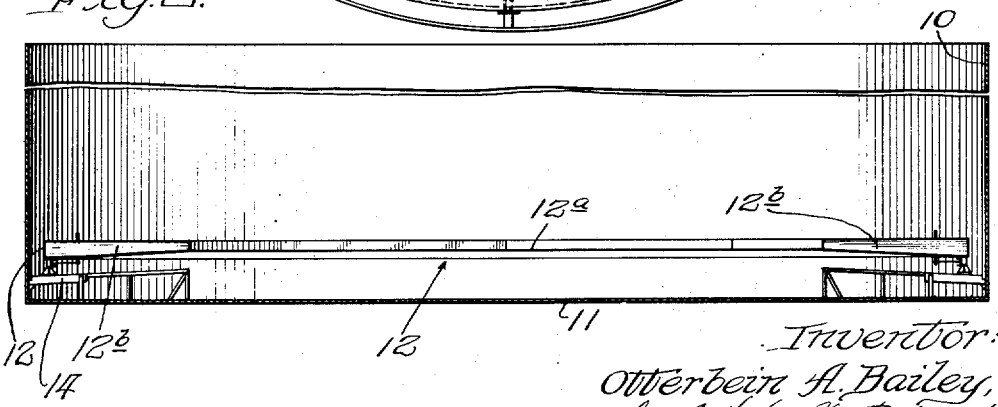
Figure 5:
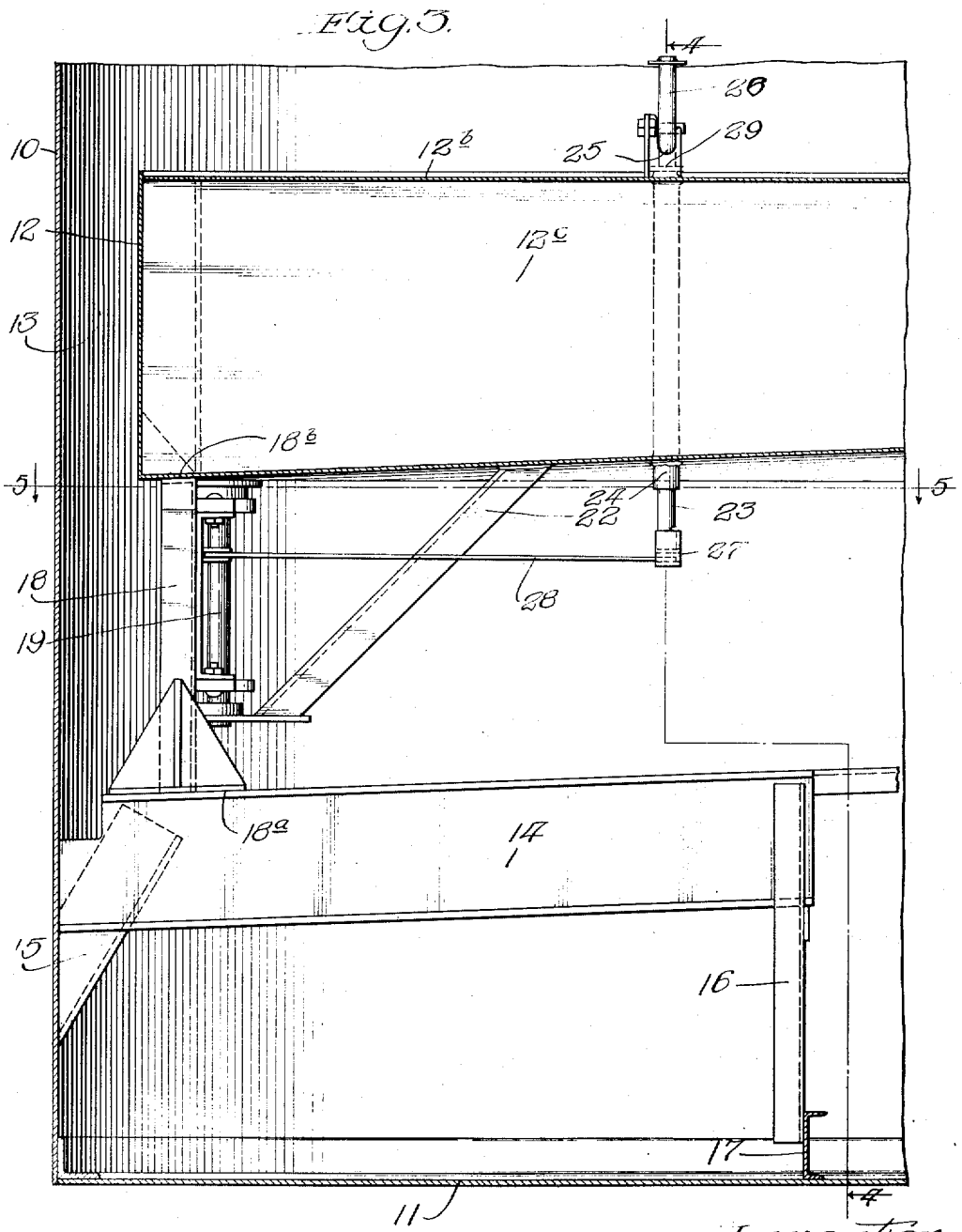
Figure 4:
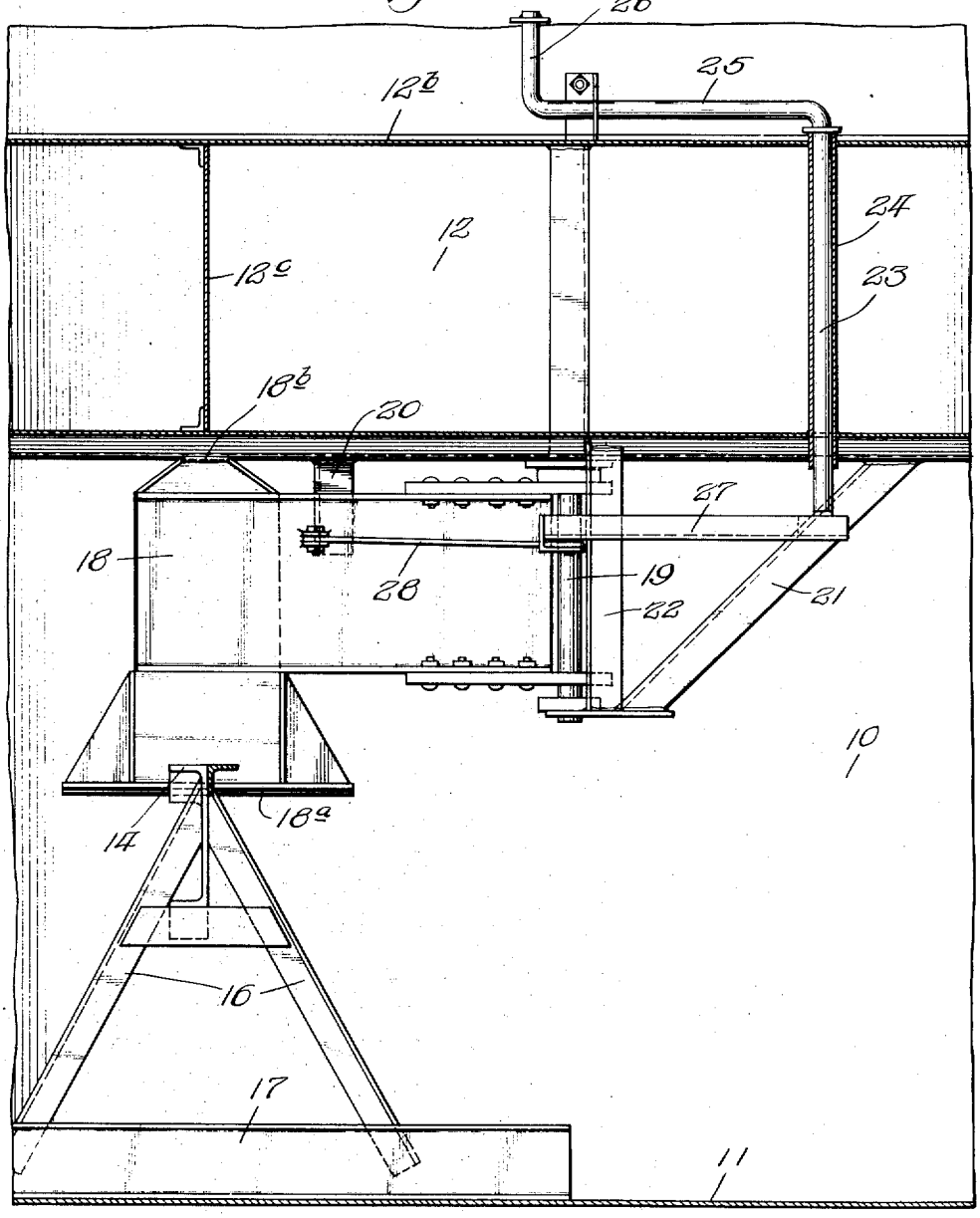
Figure 5:
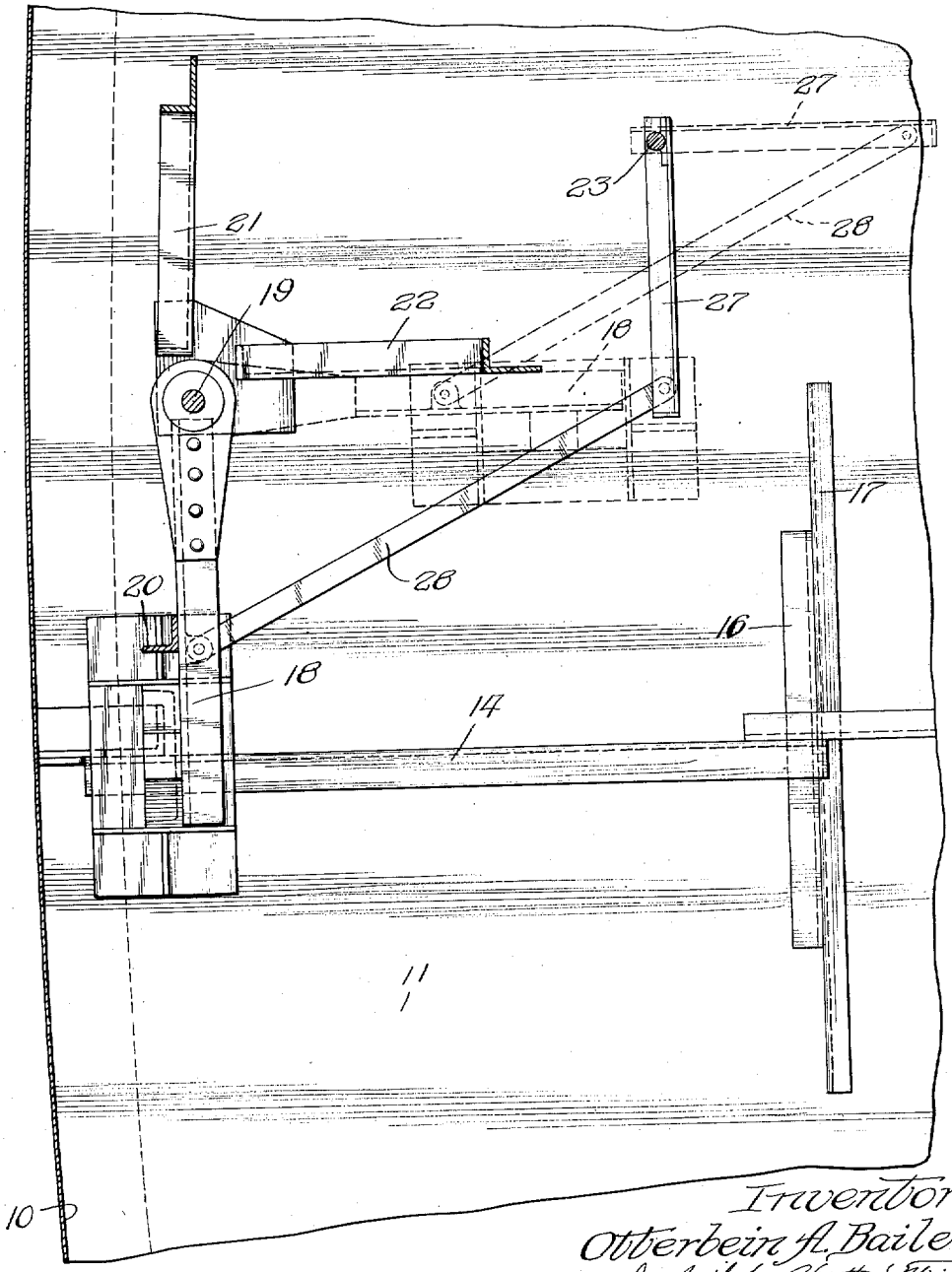
Figure 6:
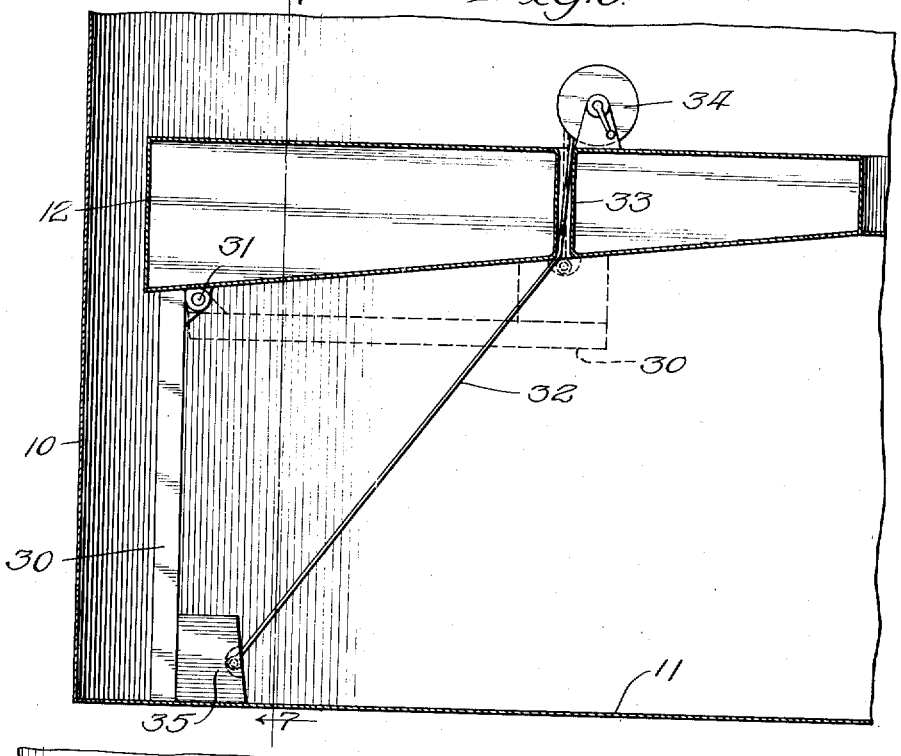
Figure 7:
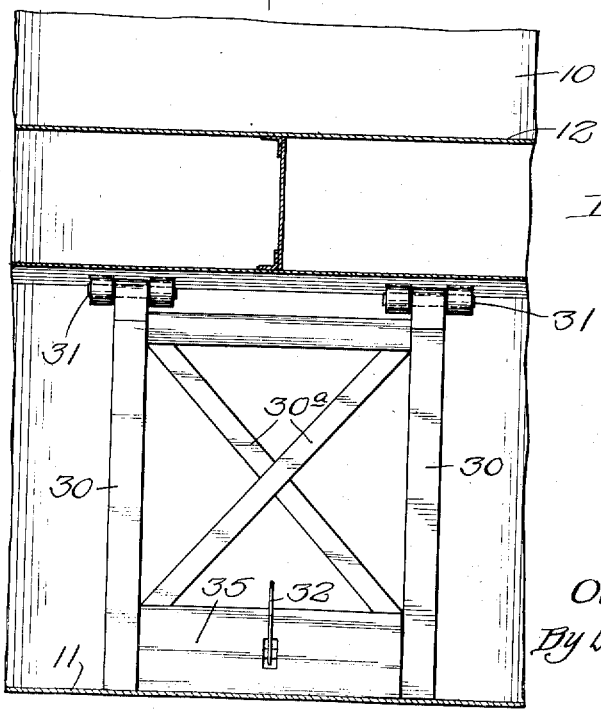

Figure 1 is a top plan view; Fig. 2 is a view taken as indicated by the line 2 of Fig. 1; Fig. 3 is a view in side elevation of one of the sustaining means; Fig. 4 is a view taken as indicated by the line 4 of Fig. 3; Fig. 5 is a view taken as indicated by the line 5 of Fig. 3; Fig. 6 is a view similar to Fig. 3 showing a modified form; and Fig. 7 is a view taken as indicated by the line 7 of Fig. 6.

As shown in the drawings, 10 may indicate the cylindrical side wall of a liquid storage tank and 11, the bottom thereof. 12 indicates, in general, a floating roof including a flat central sheet metal portion 12[a] supported by an annular pontoon 12[b], here shown as divided into eight compartments by the bulk head 12[c].

It is to be understood that any suitable means (not shown) may be employed for sealing the space 13 between the periphery 12[d] of the floating roof and the shell or side wall 10 of the tank.

In general, my invention includes a set of supports between the roof and bottom of the tank movable from operative position, where they will support the roof spaced the desired and predetermined distance above the bottom of the tank, to inoperative position, where they will permit the roof to descend closer to the bottom of the tank, and vice versa, together with means for controlling said supports from above the roof.

In the form shown in Figs. 1 to 5, inclusive, the supporting means include a set of supports on the bottom of the tank and a set of supports carried by the roof on its underside, the supports of one set being movable to operative position where they will engage the supports of the other set or to inoperative position where they will clear the supports of the other set. As here shown, the set of supports carried by the roof on its underside are the movable supports.

Describing the form shown in Figs. 1 to 5, inclusive, more particularly, 14, 14 indicates radial supporting channels on the bottom of the tank, the outer ends being supported by bracket members 15 attached to the side wall 10 and the inner ends by A-frames 16, the feet of which are attached to the supporting channels 17 resting on the tank bottom 11. As here shown, there are eight of these channel supports, one arranged substantially under each bulk head 12[c].

The set of supports carried by the roof on its underside include eight swingable gate members 18 hingedly attached to the underside of the roof by the offset vertical pivot 19. Each of the members 18 includes a wide foot 18[a] adapted to rest on the upper edge of the channel 14 and a plate 18[b] adapted to engage the underside of the roof beneath the bulk head 12[c] when the gate is in operative position, as shown in Fig. 4.

The gate may be swung inwardly on the pivot 19 to inoperative position, as shown by the broken lines in Fig. 5, in which position all the gates will clear the channel supports 14 by passing between them. A depending angle iron 20 attached to the underside of the roof is provided to limit the outward swinging of the gate or support 18. The lower end of the pivot is supported by the diagonal braces 21 and 22, the latter serving as a stop for the gate when swung to its inoperative position.

For swinging each gate I provide a shaft 23 extending through a suitable tube 24 in the pontoon of the floating roof, the upper end of the shaft 23 being provided with a crank 25 having an operating handle 26. The lower end of the shaft 23 is provided with a crank 27, the end of which is attached by a connecting rod 28 to the gate 18.

29 may indicate a notched member on the top of the pontoon in which the crank 25 may rest to retain the crank in the position shown in Fig. 4. To release the crank from this notch, the same may be lifted somewhat, the shaft 23 sliding in the tube 24.

In the form of support shown in Figs. 6 and 7 I provide a plurality of legs 30 hingedly attached to the roof by the horizontal pivots 31 near the periphery of the same. Each of these legs is adapted to hang in a vertical operative position, as shown by the solid lines in Fig. 6, or be lifted up into inoperative position, as shown by the broken lines in Fig. 6. As here shown, each leg may be lifted by a cable or chain 32 extending through a tube 33 in the pontoon and adapted to be wound up on a winch 34 on top of the roof. The bottom of each leg is preferably provided with an extension 35 to help distribute the load and also to counterweight the leg so that it will hang substantially vertical. As shown in Fig. 7, each of the legs 30 may be made of considerable width with cross-bracing 30a in order to lessen the possibility of circular side sway.

While I have shown and described certain embodiments of my invention, it is to be understood that it is capable of many modifications. Changes therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A liquid storage tank, comprising a bottom and side wall, a floating roof adapted to normally rest upon liquid in the tank, a set of hinged supports between the roof and the bottom of the tank swingable from operative position where they will support the roof spaced a predetermined distance above the bottom of the tank to inoperative position where they will permit the roof to descend closer to the bottom of the tank, and vice versa, and means for controlling said supports from above the roof.

2. A liquid storage tank, comprising a bottom and side wall, a floating roof adapted to normally rest upon the liquid in the tank, and means for sustaining the roof spaced a predetermined distance above the bottom of the tank when empty, said means including a set of radial supports on the bottom of the tank and a set of supports carried by the roof on its underside on vertical pivots and swingable on said pivots from operative position where they will engage the radial supports on the bottom of the tank to inoperative position where they will clear said radial supports, and vice versa.

3. Apparatus as claimed in claim 2, with means for swinging said supports operable from above the roof.

4. A liquid storage tank, comprising a bottom and side wall, a floating roof adapted to normally rest upon liquid in the tank, and means for sustaining the roof spaced a predetermined distance above the bottom of the tank when empty, said means including a set of supports on the bottom of the tank, and a swingable gate member attached to the underside of the roof by an offset vertical pivot for each of the supports on the bottom of the tank.

5. Apparatus as claimed in claim 4, with means for swinging the gate members on their vertical pivots from above the roof.

6. A liquid storage tank, comprising a bottom and side wall, a floating roof adapted to normally rest upon liquid in the tank, and means for sustaining the roof spaced a predetermined distance above the bottom of the tank when empty, said means including a set of supports on the bottom of the tank and a set of movable supports attached to the underside of the roof on vertical pivots and swingable on said pivots to operative position where they will engage the supports of the other set or to inoperative position where they will clear said supports of said other set.

7. Apparatus as claimed in claim 6 with means operable from above the roof for swinging said supports on said pivots.

OTTERBEIN A. BAILEY.